Patented July 10, 1923.

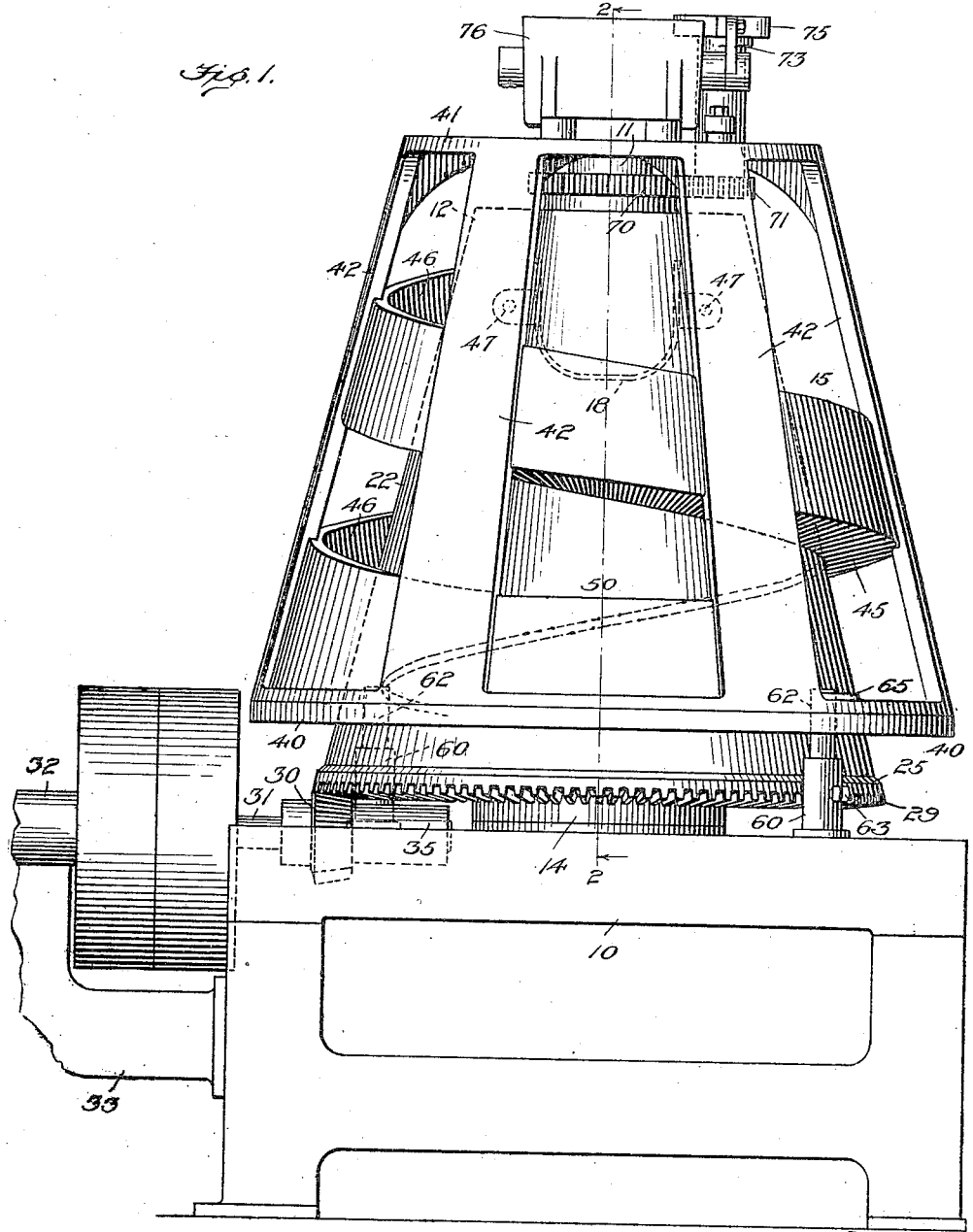

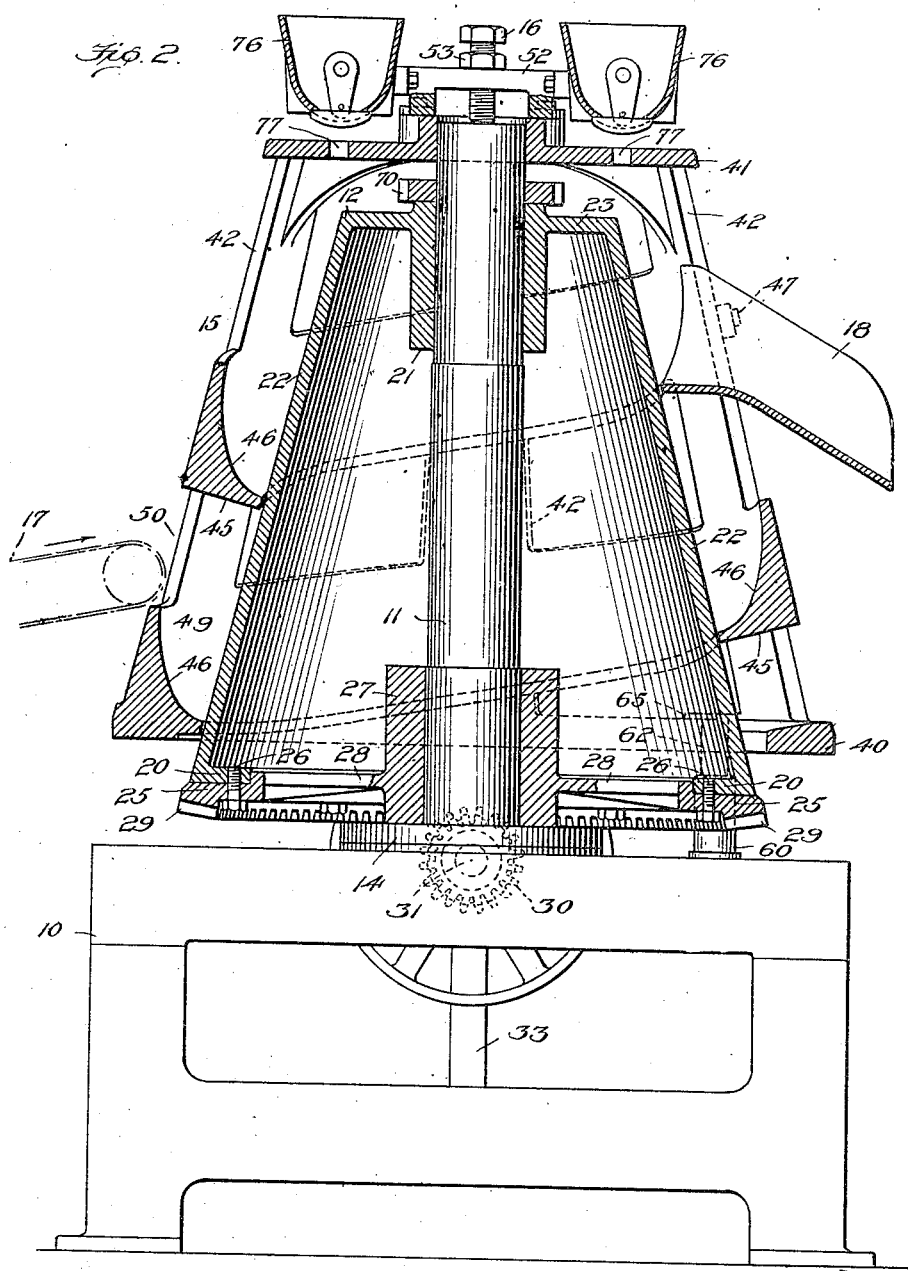

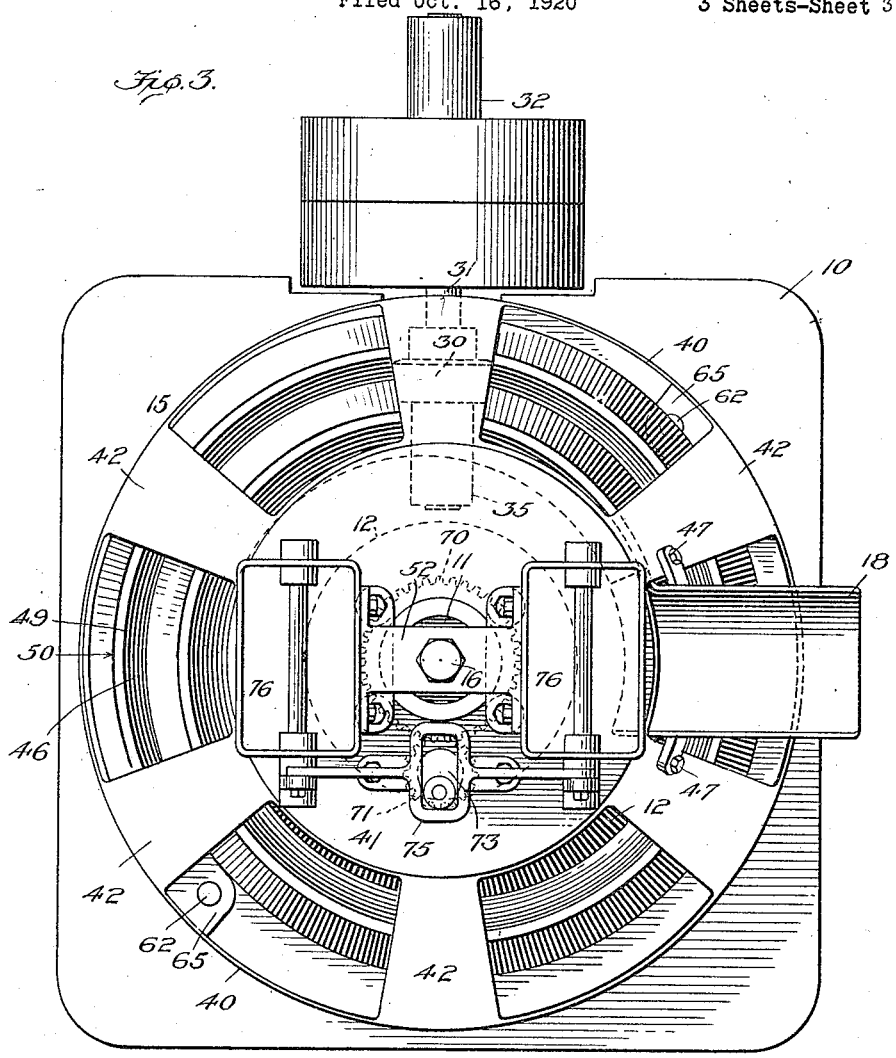

1,461,076

UNITED STATES PATENT OFFICE.

FRANK H. VAN HOUTEN, OF BEACON, NEW YORK, ASSIGNOR TO DUTCHESS TOOL COMPANY, OF BEACON, NEW YORK, A CORPORATION OF NEW YORK.

DOUGH ROUNDING-UP MACHINE.

Application filed October 16, 1920. Serial No. 417,469.

*To all whom it may concern:*

Be it known that I, FRANK H. VAN HOUTEN, a citizen of the United States, residing at Beacon, in the county of Dutchess and State of New York, have invented certain new and useful Improvements in Dough Rounding-Up Machines; and I do hereby declare the following to be a full, clear, and exact description of the same, reference being had to the accompanying drawings, forming part of this specification.

This invention relates to machines for rounding up lumps of dough and has particular reference to a machine for rounding up such lumps by moving them upwardly while in rolling contact with a conical member.

The principal object of the invention is to provide a machine of this type which will give superior results in the rounding-up of the dough.

A further object of the invention lies in the provision of a spiral path or molding fence which will fit the contour of the cone to a nicety under all conditions of temperature, etc., by reason of a new and novel adjusting means for maintaining the proper relations between the cone and the molding fence. This ability to maintain proper adjustment is of the utmost importance, since it absolutely prevents the formation of the small pieces of dough usually formed by the hundreds in bakeries and called "pills."

A still further important object of the invention lies in the provision of a molding fence that may be used to deliver either to the right or to the left of the power shaft thereby avoiding the necessity of furnishing individual right hand or left hand machines as is the present custom.

In the drawings:—

Figure 1 represents a preferred form of the device in side elevation;

Fig. 2 is a central vertical section taken on the line 2—2 of Figure 1;

Fig. 3 is a plan view, and

Fig. 4 is a vertical elevation of the upper section of the device showing the connection with the flour sifters.

The base 10 of the device is the usual substantial heavy metal table common in the art, having at its center a vertical post 11 preferably of two diameters as shown. A cone-shaped drum denoted generally by the numeral 12 is rotatably mounted upon this post 11 and may be either supported directly from a bearing plate 14 as shown, or may be mounted upon the usual annular thrust bearing if desired. A molding fence denoted generally by the numeral 15 surrounds the rotating drum 12 and is relatively stationary with respect to the table, but may nevertheless be rotated about its axis, since the adjusting screw 16 which supports it is coaxial with the post 11 and consequently with the axis of rotation of the drum 12. The fence receives spaced lumps of dough from the endless belt 17 and delivers the rounded-up balls to any desired mechanism by way of the trough 18.

The drum 12 is generally of frusto-conical shape and includes an inturned lower flange 20 and an integral hub portion 21 adapted to fit the reduced diameter of the upper portion of the post 11, such hub 21 being connected to the peripheral surface 22 by means of a top plate or web 23 integral with both. An annular bevel gear ring 25 is secured to the flange 20 by bolts 26 or other desired securing means. The lower hub 27 of the drum 12 is secured to the flange 20 by means of a plurality of spokes 28 and is of sufficient height to afford easy bearing for the drum and to maintain it at such a height from the table that the large bevel gear 29 will mesh properly with the driving pinion 30 on the main drive shaft 31 supported between the journal 32 carried by a bracket 33 extending from the table, and by a journal box 35 carried by the table just inside the gears 29 and 30.

The frame for the molding fence 15 consists generally of a lower ring 40 and an upper base 41 connected together by a plurality of substantially vertical staves 42, the latter supporting the fence which is a spiral path conical upon its outer edge and having a bottom 45 at substantially right angles thereto, and also having a curved surface 46 of the cross-sectional curvature shown in Figure 2. the section being approximately half of a parabola. It will be understood that in practice all of these parts are integral forming a single casting. A discharge spout 18 is secured to two adjacent staves 42 by means of bolts 47 so as to receive the rolls of dough from the highest point of the fence. The carrier belt 17 discharges to the pocket 49 between the lower reach of the fence and the cone, the balls passing through an opening 50 between adjacent staves 42.

The upper base 41 carries a yoke 52 generally pi-shaped, that is like a double T, and threaded at its upper central part to receive the adjusting screw 16 which may be locked against the yoke by means of the nut 53. Since this adjusting screw 16 is coaxial with the base 11, movement of the nut will raise and lower the molding fence with respect to the base and consequently with respect to the rotating drum which is maintained at a fixed height above the base or table.

A plurality of socket members 60, preferably two in number, are secured to the table in convenient position, preferably diametrically opposite each other, and are adapted to receive machined pins 62 and to secure them in desired position by means of the set screws 63. The ring 40 of the fence is provided with a plurality of lugs 65 corresponding in number to the socket members 60 and which are perforated to receive snugly the guiding pins 62.

As the fence is raised or lowered by adjustment of the screw 16, the pins 62 guide the frame so as to retain it coaxial with the post 11 during such movement, thus providing a three-point guiding means for the molding fence which enables one to secure an extremely accurate adjustment between the drum and the spiral, the cone surface of the drum having a uniform taper and the spiral fence being fitted accurately to it, so that by movement of the adjusting screw 16 the clearance between the two members may be made as small as may be desired. Improper adjustment of the fence with respect to the drum forms hundreds of small spheres of dough, technically known in the art as "pills." Due to the close adjustment which can be secured by these pins and screws, it is possible to entirely avoid the loss due to the formation of the so-called pills.

A gear 70 is secured to the upper portion of the drum 12 in any desired manner and meshes with a pinion 71 on a stud shaft 72 the latter carrying at its upper end a crank 73 working in the oblong central opening of a connecting rod 75 adapted to oscillate the flour sifting mechanism contained in the two flour troughs 76 secured to the extending ends of the top of the yoke 52. The flour sifted from these troughs falls through slots 77 in the upper base 41 on a line with the outer edge of the top of the drum and the flour is thus fed down the inclined surface at such rate as may be desired.

An important feature of the construction is the ability to convert the device from a right hand to a left hand machine or vice versa as conditions may require. In all machines now manufactured both right hand and left hand machines are supplied so that a purchaser must order an individual machine for each of the two uses. In the device illustrated, however, the change is accomplished in a simple manner by dropping the guiding pins 62 by loosening the set screws 63 and allowing them to drop clear of the lower ring 40 of the spiral molding fence and by turning the frame 180° and then replacing the pins. It will be noted that this movement does not in any way interfere with the action of the drum driving means or the means for driving the sifters in the troughs 76. If the pins 62 were made integral with the base this change could be made by raising the fence clear of the pins, turning it half way round and again bringing it over the pins. It is much preferred, however, to have the pins 62 separable, since they are carefully machined and can readily be replaced when slightly worn.

The operation of the device is believed to be apparent from the foregoing. Motive power is delivered to the shaft 31 by any desired means, as for example, a motor or the fast and loose pulleys illustrated. The drum is rotated by means of the bevel gear 29 at its bottom outer edge while the molding fence remains stationary. The balls of dough are delivered by the belt 17 through the opening 50 to the pocket 49 from whence they are rolled, by means of the rotating drum, up the spiral inclined path to the exit opening adjacent the trough 18 which delivers the rounded-up balls to the proper mechanism. During this operation flour is continually sifted down the inclined surface of the drum, such flour sifting means being driven by means of the gearing 70, 71.

What I claim is:

1. In a dough machine, a cone-shaped drum, a spiral molding fence coaxial with said drum, and means for altering the clearance between said fence and drum.

2. In a dough machine, a cone-shaped drum, a spiral molding fence surrounding said drum and having a delivery exit, driving means for rotating said drum, and means for locating said fence with respect to said driving means as to deliver the dough balls in any chosen direction with respect to said driving means.

3. In a dough machine, a post, a cone-shaped drum rotatably mounted on said post, means for driving said drum, a spiral molding fence surrounding said drum, adjusting means carried by said fence and engageable with said post for altering the clearance space between said fence and said drum.

4. In a machine for rounding up lumps of dough, a supporting member, a spiral fence carried by said supporting member and adjustable vertically thereon, and means for guiding said fence so as to maintain it coaxially in all positions.

5. In a machine for rounding up lumps of dough, a rotating member, a molding fence surrounding said member and movable coaxially therewith to alter the clearance between said fence and said member, and means for securing said fence in desired adjusted position.

6. In a machine for rounding up lumps of dough, a rotating member, a molding fence coaxial therewith and movable longitudinally of the axis of said rotating member to adjust the clearance between said rotating member and said molding fence, adjusting means for securing said fence in desired position, and means for guiding said fence and for maintaining it coaxially with the axis of rotation of said member.

7. In a machine for rounding up lumps of dough, a spiral molding fence having an inlet opening and an outlet opening diametrically opposite each other and at a different height, a support, means for raising and lowering said fence with respect to said support and diametrically opposite means for guiding said fence during its adjustments with respect to said support.

8. In a machine for rounding up lumps of dough, a base, a guiding member on said base, a spiral molding fence vertically adjustable on said base and engageable in a plurality of positions with said guiding means.

9. In a machine for rounding up lumps of dough, a base, a revolving member mounted on said base, a spiral molding fence adjustable vertically with respect to said base and said revolving member, and a three-point guiding means for adjusting the position of said fence, said guiding means being engageable with said fence to maintain it in any one of a plurality of angular positions with respect to said base at any adjusted height.

10. In a machine for rounding up lumps of dough, a rotatable cone-shaped drum, a molding fence mounted coaxially of said drum and itself rotatably mounted with respect to said drum when the latter is stationary, means for rotating said drum, and means for guiding said fence for longitudinal movement with respect to said drum in any one of a plurality of chosen positions of rotation without interfering with the rotation of said drum.

11. In a machine for rounding up lumps of dough, a base, a vertical post secured thereto, a guiding means located on said base at one side of said post, a cone-shaped rotatable drum mounted on said post, means for rotating said drum, a spiral molding fence coaxial with said post and supported from the center thereof, said support including an adjusting means for altering the height of said molding fence from said table, said molding fence being provided with a plurality of spaced holes any one of which is adapted to cooperate with said guiding means.

FRANK H. VAN HOUTEN.